Jan. 6, 1953  J. R. GODBOUT  2,624,433
ACCELERATOR CONTROL FOR AUTOMOBILES
Filed May 7, 1950  2 SHEETS—SHEET 1

INVENTOR.
Joseph R. Godbout,
BY Victor J. Evans & Co.
ATTORNEYS

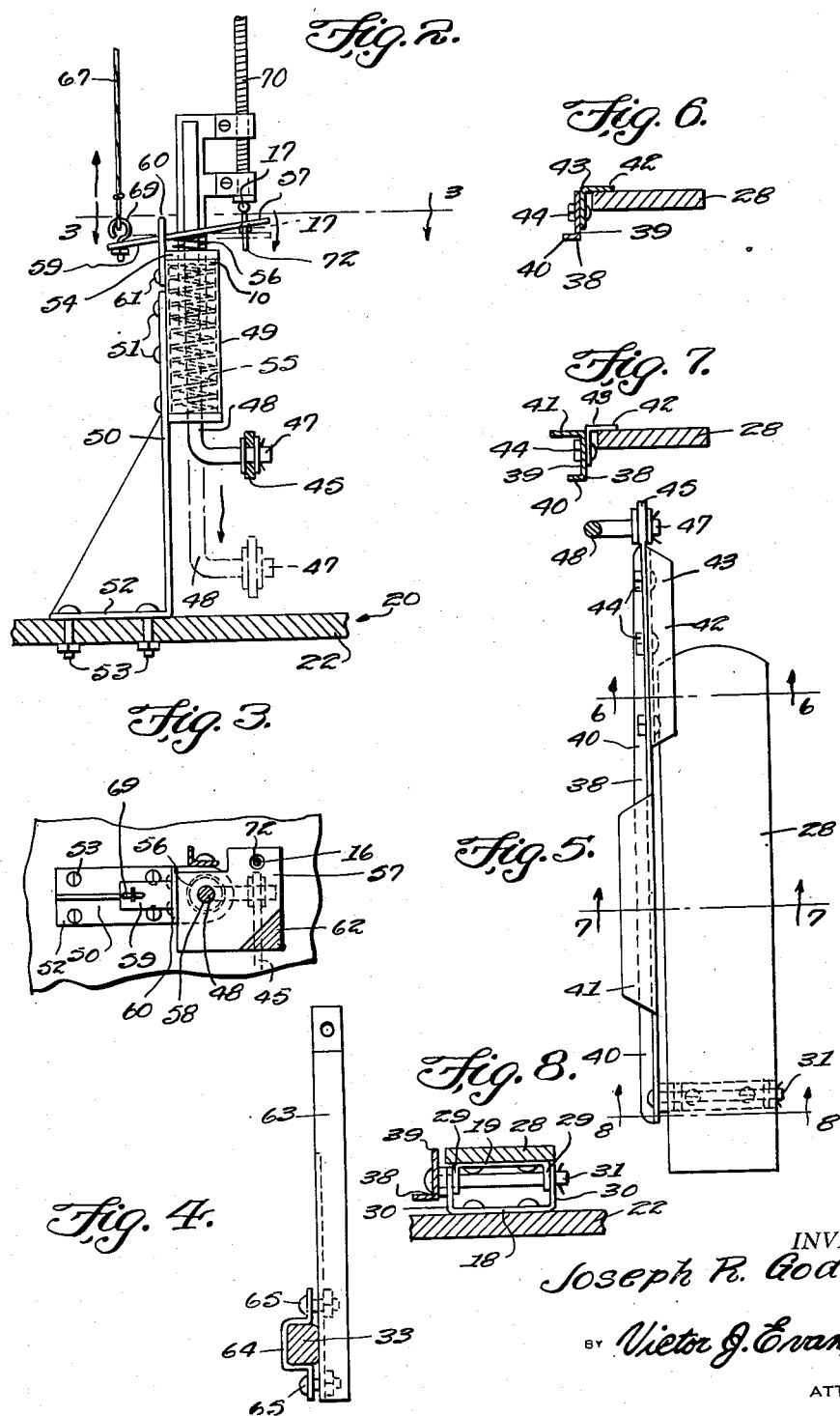

Patented Jan. 6, 1953

2,624,433

UNITED STATES PATENT OFFICE 2,624,433

ACCELERATOR CONTROL FOR AUTOMOBILES

Joseph R. Godbout, Washington, D. C.

Application November 7, 1950, Serial No. 194,515

6 Claims. (Cl. 192—3)

This invention relates to an automotive vehicle, and more particularly to a mechanism for locking the accelerator pedal of the vehicle.

The object of the invention is to provide a mechanism for holding the accelerator of an automobile in a predetermined position whereby the operator's leg or foot will not become tired, as on a long drive or trip.

Another object of the invention is to provide an accelerator lock that will release immediately upon actuation of the brake pedal, the mechanism of the present invention allowing the accelerator to be depressed to cause a burst of speed for passing, and the mechanism of the present invention can be disconnected altogether by a simple operation for city cruising.

A further object of the invention is to provide an accelerator lock which is extremely simple and inexpensive to manufacture.

Other objects and advantages will be apparent during the course of the following description.

In the accompanying drawings forming a part of this application and in which like numerals have been used to designate like parts throughout the same:

Figure 2 is a detail, sectional elevational view illustrating certain parts of the accelerator lock mechanism;

Figure 3 is a sectional view taken on the line 3—3 of Figure 2;

Figure 4 is a detail sectional view illustrating the means for attaching the brake pedal-actuating mechanism to the brake pedal;

Figure 5 is a plan view of the accelerator mechanism;

Figure 6 is a sectional view taken on the line 6—6 of Figure 5;

Figure 7 is a sectional view taken on the line 7—7 of Figure 5;

Figure 8 is a sectional view taken on the line 8—8 of Figure 5.

Figure 1:
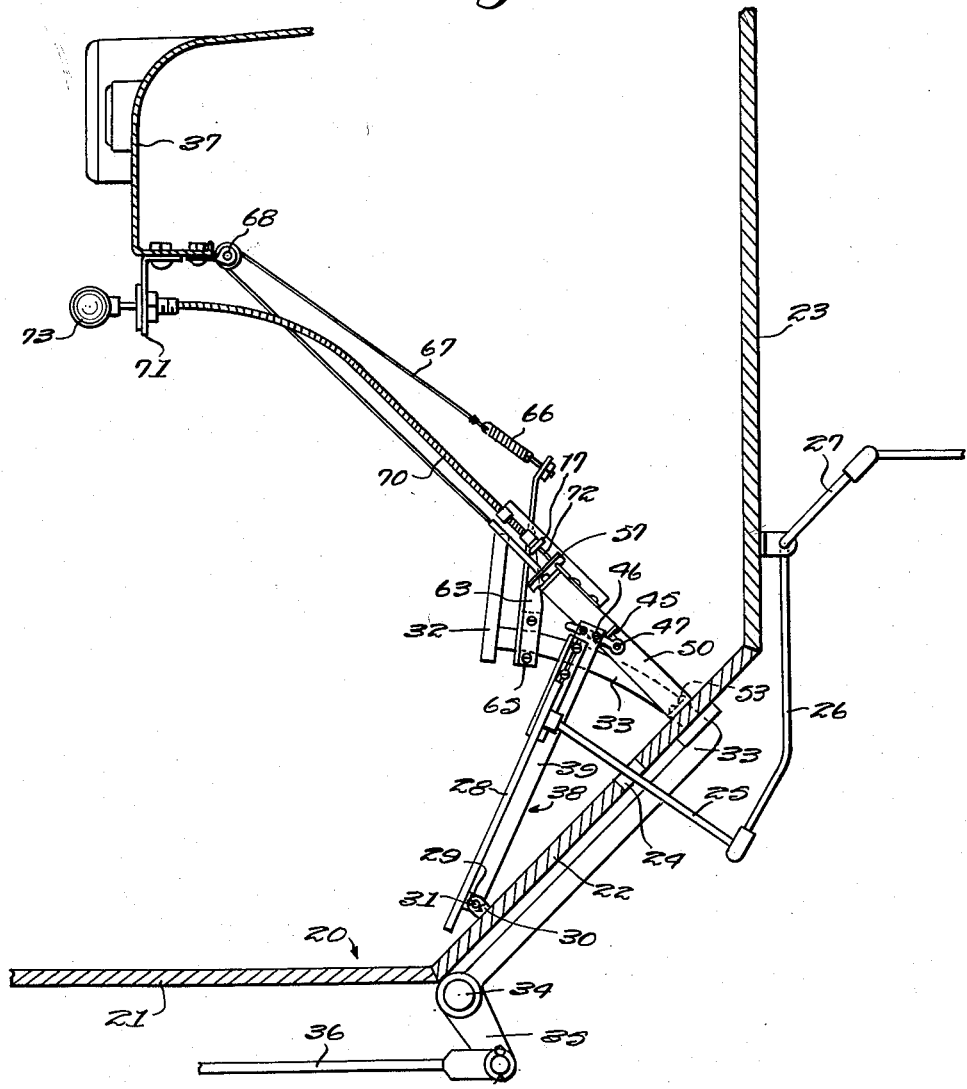
Figure 1 is a side elevational view of the accelerator lock of the present invention, as installed in a conventional automobile, with parts broken away and in section.

Referring in detail to the drawings, there is shown a portion of a vehicle floor board which is indicated generally by the numeral 20, Figure 1. The floor board includes a bottom wall 21, an inclined wall 22, and a back wall 23, there being an opening 24 arranged in the inclined wall 22 for the slidable projection therethrough of the conventional lever 25. The upper end of the lever 25 is connected to the accelerator pedal 28, and the rear end of the lever 25 is connected to a link 26, the link 26 being connected to the accelerator bellcrank 27. Thus, upon depression or actuation of the accelerator pedal 28, the amount of fuel, such as gasoline, passing to the engine carburetor can be varied to thereby control the speed of the vehicle.

The accelerator pedal 28 has its lower end provided with a yoke 19 and spaced, parallel, apertured ears 29, Figure 8, and the ears 29 are pivotally connected to apertured ears 30 that project from a yoke 18 that is secured to the inclined wall 22, by a pivot pin 31.

The numeral 32 designates a conventional foot brake pedal, Figure 1, and an L-shaped arm 33 is secured to the pedal 32 and projects through the inclined wall 22. The arm 33 is pivotally connected by a pin 34 to a link 35, and the link 35 is connected to the usual actuating rod 36 that leads to the master cylinder. The vehicle dashboard is indicated by the numeral 37.

The present invention is directed to the mechanism for locking or holding the accelerator pedal 28 in its various adjusted positions, so that the automobile or other vehicle will be driven without the necessity of the driver maintaining his foot on the accelerator pedal. The mechanism of the present invention includes a bracket 38 which may be fabricated of any suitable material such as metal, and the bracket 38 is arranged contiguous to the accelerator pedal 28, the bracket 38 permitting the accelerator pedal to be depressed when the gears are to be shifted. The bracket 38 includes a straight portion 39 that has its lower end pivotally mounted on the pin 31, and extending from the lower edge of the straight portion 39 is a flange 40, Figure 7, for engagement with the inclined wall 22 to limit downward pivotal movement of the bracket 38. Projecting from the upper edge of the bracket 38 is a lip 41, Figure 5, which is adapted to be engaged by the driver's foot in order to adjust the position of the bracket, while also extending from the bracket 38 is a flange 42, the flange 42 overlying a portion of the accelerator pedal 28. The flange 42 forms part of an L-shaped member 43, Figures 6 and 7, and is secured to the bracket 38 by bolt-and-nut assemblies 34. The bracket 38 is constructed so that the accelerator pedal 28 can be depressed independently of the bracket 38, as when the driver wishes to shift gears or when the driver wishes to accelerate the vehicle in order to pass another vehicle or climb a hill, and when the pedal 28 is released, the flange 42 will insure that the accelerator pedal 28 returns to its previous position.

The upper end of the bracket 38 is connected to an arcuate link 45 by means of a bolt and nut assembly 46, Figure 1, while the other end of the link 45 is pivotally mounted on the transverse end 47 of an L-shaped rod 48. The rod 48 slidably projects through a hollow sleeve 49, the sleeve 49 being secured to an upstanding portion of a support member 50 by suitable securing elements, such as screws 51, Figure 2. The support member 50 includes a base 52 that is secured to the inclined wall 22 by bolt-and-nut assemblies 53.

The rod 48 extends slidably through an apertured collar 54, and a coil spring 55 is circumposed on the rod 48 and positioned within the sleeve 49. Arranged exteriorly of the sleeve 49 and circumposed on the rod 48 is a small coil spring 56 which has an inclined surface that is arranged in engagement with the plate 57. The plate 57 is provided with an opening 58 for the slidable projection therethrough of the rod 48. The coil spring 56, with its inclined surface, normally urges the plate 57 into locking relation with respect to the rod 48 so that the rod 48 will be maintained immobile in its various adjusted positions. The plate 57 includes a narrow portion 59 that projects through a slotted ear 60, the ear 60 being secured to the sleeve 49 by screws 61, so that a pivotal connection between the plate 57 and ear 60 is provided. The plate 57 is provided with an inclined, downturned portion 62 which is adapted to be engaged by the operator's foot, whereby the plate 57 can be moved slightly to permit the rod 48 to be moved to unlocked position (i. e., from the solid line position to the broken line position in Figure 2). Coil spring 55 constitutes a throttle pedal return spring and abuts a washer 19 which is attached to the rod 48 below plate 54. The plate 54 lies on top of the sleeve as a reaction plate for spring 56.

A means is provided for releasing or unlocking the accelerator pedal 28 when the brake pedal 32 is depressed, and this means comprises a finger 63 which is connected to a clamp 64 by bolt-and-nut assemblies 65, the clamp 64 and finger 63 being mounted on the brake pedal arm 33, Figure 4. The free end of the finger 63 is connected to the lower end of a coil spring 66, there being a cable 67 connected to the upper end of the coil spring 66. The cable 67 is trained over a pulley 68, and the cable 67 is connected to an eye bolt 69, the stud bolt 69 being connected to the narrow section 59 of the plate 57, Figure 2. The pulley 68 is supported by the dashboard 37, Figure 1.

A manually operable means is provided for disengaging the locking mechanism of the present invention, whereby the accelerator pedal 28 can be used in the normal manner, as during city driving. This manually operable means comprises a flexible tube 70 which extends downwardly and rearwardly from an L-shaped body member 71 that is secured to the dashboard 37, and a cable or rod 72 slidably extends through the tube 70. The cable 72 has a bushing 17 connected to its lower end, and the cable 72 slidably projects through an opening 16 in the plate 57, there being a knob 73 connected to the other end of the cable, so that by manually moving the knob 73, the plate 57 can be pivoted to free the rod 48.

In use, the knob 73 is pulled outwardly away from the dashboard 37, so that the coil spring 56 urges the plate 57 from the broken line position of Figure 2 to the solid line position. Then, the driver depresses the accelerator pedal 28 the desired distance according to the speed that is desired, and at the same time the driver's foot engages the lip 41. Thus, the bracket 38 and the accelerator pedal 28 are both pivoted the same amount about the pin 31. Then, the pressure on the pedal 28 by the driver's foot can be released and the accelerator pedal will be maintained depressed in its adjusted position, so that the vehicle will continue traveling at the same speed. The flange 42 will prevent the pedal 28 from returning to its previous position, and the locking plate 57 is arranged in such a position and at such an angle that the bar 48 cannot move from its adjusted position. Therefore, the vehicle will continue traveling in a constant speed without the necessity of the driver maintaining his foot on the pedal 28.

In order to unlock the accelerator pedal 28 so as to permit normal driving, the driver can merely touch the downturned portion 62 of the plate 57 with his foot so that the plate 57 will pivot or tilt slightly from the solid line position of Figure 2 to the broken line position of Figure 2, whereby the rod 48 can slide through the opening 58 of the plate 57 and the sleeve 49 so that the coil spring 55 will cause the rod 48 and bracket 38 to move and permit the pedal 28 to be worked in the usual way. Another way of releasing the pedal 28 from its locked position is to hit or engage the brake pedal 32 with the foot. This causes the cable 67 to pivot the plate 57 from the solid line position of Figure 2 to the broken line position, so that bracket 38 will not lock or hold the pedal 28 immobile. It is to be noted that even when the bracket 38 is holding the pedal 28 down, the pedal 28 can still be further depressed so as to accelerate the vehicle, as when it is necessary to pass a car or climb a hill. Further, by pushing in on the knob 73, the bushing 17 will engage the plate 57 to keep the locking mechanism out of use, so that the accelerator pedal can be used for normal use for city driving and the like.

I claim:

1. In a vehicle, the combination with a floor board, an accelerator pedal having its lower end pivotally connected to said floor board, a brake pedal having an arm projecting through said floor board, and a dashboard, a mechanism for holding the accelerator pedal in a predetermined position, said mechanism comprising an L-shaped support member secured to said floor board, a hollow sleeve secured to said support member, a rod slidably arranged in said sleeve, a first coil spring circumposed on said rod, a bracket arranged contiguous to said accelerator pedal and having one end pivotally connected to said floor board, and its other end pivotally connected to said rod, a plate pivotally connected to said sleeve and having an opening for the projection therethrough of said rod, a second coil spring circumposed on said rod for normally urging said plate into locking relation with respect to said rod, and means for disengaging said plate from locking engagement with said rod upon actuation of said brake pedal.

2. In a vehicle, the combination with a floor board, an accelerator pedal having its lower end pivotally connected to said floor board, a brake pedal having an arm projecting through said floor board, and a dashboard, a mechanism for holding the accelerator pedal in a predetermined position, said mechanism comprising an L-shaped support member secured to said floor board, a hollow sleeve secured to said support member, a rod slidably arranged in said sleeve, a first coil spring circumposed on said rod, a bracket arranged contiguous to said accelerator pedal and having one end pivotally connected to said floor board and its other end pivotally connected to said rod, a plate pivotally connected to said sleeve and having an opening for the projection therethrough of said rod, a second coil spring circumposed on said rod for normally urging said plate into locking relation with respect to said rod, and means for disengaging said plate from locking engagement with said rod upon actuation of said brake pedal, said means comprising a finger secured to said brake pedal arm, a third coil spring having one end connected to said finger, a pulley connected to said dashboard, and a cable having one end connected to said last-named spring and its other end connected to said plate.

3. In a vehicle, the combination with a floor board, an accelerator pedal having its lower end pivotally connected to said floor board, a brake pedal having an arm projecting through said floor board, and a dashboard, a mechanism for holding the accelerator pedal in a predetermined position, said mechanism comprising an L-shaped support member secured to said floor board, a hollow sleeve secured to said support member, a rod slidably arranged in said sleeve, a first coil spring circumposed on said rod, a bracket arranged contiguous to the accelerator pedal and having one end pivotally connected to said floor board and its other end pivotally connected to said rod, a plate pivotally connected to said sleeve and having an opening for the projection therethrough of said rod, a second coil spring circumposed on said rod for normally urging said plate into locking relation with respect to said rod, and means for disengaging said plate from locking engagement with said rod upon actuation of said brake pedal, said means comprising a finger secured to said brake pedal arm, a third coil spring having one end connected to said finger, a pulley connected to said dashboard, and a cable having one end connected to said last-named spring and its other end connected to said plate, and manually operable means for disconnecting said mechanism.

4. In a vehicle, the combination with a floor board, an accelerator pedal having its lower end pivotally connected to said floor board, a brake pedal having an arm projecting through said floor board, a dashboard, a mechanism for holding the accelerator pedal in a predetermined position, said mechanism comprising an L-shaped support member secured to said floor board, a hollow sleeve secured to said support member, a rod slidably arranged in said sleeve, a first coil spring circumposed on said rod, a bracket arranged contiguous to said accelerator pedal and having one end pivotally connected to said floor board and its other end pivotally connected to said rod, a plate pivotally connected to said sleeve and having an opening for the projection therethrough of said rod, a second coil spring circumposed on said rod for normally urging said sleeve into locking relation with respect to said rod, and means for disengaging said plate from locking engagement with said rod upon actuation of said brake pedal, said means comprising a finger secured to said brake pedal arm, a third coil spring having one end connected to said finger, a pulley connected to said dashboard, a cable having one end connected to said last-named spring and its other end connected to said plate, manually operable means for disconnecting said mechanism, said manually operable means comprising a flexible tube extending downwardly and rearwardly from said dashboard, a cable slidably arranged in said tube and having one end engaging said plate, and a knob secured to the other end of said cable.

5. The apparatus as described in claim 4, wherein said plate is provided with a downturned portion adapted to be engaged by the driver's foot for selectively moving the plate out of locking engagement with said rod.

6. The apparatus as described in claim 4, and further including a bracket having a flange overlying a portion of the accelerator pedal, said bracket being provided with a lip adapted to be engaged by the user's foot.

JOSEPH R. GODBOUT.

REFERENCES CITED

The following references are of record in the file of this patent:

UNITED STATES PATENTS

| Number | Name | Date |
|---|---|---|
| 2,085,352 | Cook | June 29, 1937 |
| 2,167,843 | Johnson | Aug. 1, 1939 |
| 2,180,209 | Johnson | Nov. 14, 1939 |
| 2,180,307 | Lucker | Nov. 14, 1939 |
| 2,318,931 | Diver | May 11, 1943 |